INVENTORS:
SIMON SLUTSKY
ROGER A. TOMBOULIAN
BY

ATTORNEYS.

United States Patent Office 3,442,115
Patented May 6, 1969

3,442,115
SONIC BOOM PRESSURE WAVE SIMULATION METHOD AND APPARATUS
Simon Slutsky, Franklin Square, and Roger Tomboulian, Uniondale, N.Y., assignors to General Applied Science Laboratories, Inc., Westbury, N.Y.
Filed July 21, 1967, Ser. No. 655,142
Int. Cl. G01n 3/62
U.S. Cl. 73—12                                3 Claims

ABSTRACT OF THE DISCLOSURE

Pressure waves closely simulating "sonic boom" waves are produced by regulating the mass flow rate of a gas from a pressurized source in accordance with a mathematical function derived from the general flow equations describing the gas flow. The resulting pressure waves are transmitted to a test station in substantially spherical form by means of a diverging conduit whose walls are substantially straight in the direction of wave travel. In one embodiment of the invention, the mass flow rate is regulated in accordance with the time-integral of the pressure wave desired by varying the exit area of a sonic nozzle which is supplied with compressed gas at a super-critical pressure. The effects of unwanted reflected waves can be eliminated by providing a vacuum source in combination with the pressure source. Traveling pressure waves closely simulating traveling sonic boom waves are produced in all embodiments of the invention.

---

The invention relates to methods and apparatus for producing pressure waves having a predetermined pressure waveshape and amplitude. More particularly, this invention relates to methods and apparatus for "sonic boom" testing; that is, to methods and apparatus for producing pressure waves similar to those produced by aircraft flying at sonic and supersonic speeds and for testing the effects of such waves on people and objects which respond to and/or are subject to damage by such waves.

Prior tests of the effects of "sonic boom" phenomena have been made primarily by flying aircraft over a test area at supersonic speeds. This method, however, is very expensive. Also, it is of limited usefulness since it cannot be used to pre-test the effects of proposed aircraft designs, but can be used only after the aircraft has been built.

Partial tests of the effects of sonic boom waves have been made by use of large electrical-powered loudspeakers, as is described, for example, in 39 "Journal of the Acoustical Society of America," No. 5, May 1966, entitled, "Sonic Boom Symposium." However, such equipment is very expensive. Also, the tests are inaccurate and incomplete; they do not actually simulate sonic boom shock waves and thus do not fully test the effect of such waves on the test subjects. For example, the waves produced in such tests do not "sweep" over the test subject in the manner in which actual sonic boom waves do.

In view of the foregoing problems, a major object of the present invention is to provide relatively simple and inexpensive methods and apparatus for producing pressure waves, specifically, sonic boom pressure waves of predetermined waveshape, and for directing such waves towards people and other test subjects, and for determining the effects of such waves on the test subjects. It is another object of the invention that the apparatus be located on the ground so that actual flight tests are not required. A further object of this invention is to provide such apparatus which produces and directs pressure waves with a "sweeping" action simulating that of actual sonic boom waves.

The invention and some of its advantages now will be described with the assistance of the accompanying drawings, in which.

Figure 5:
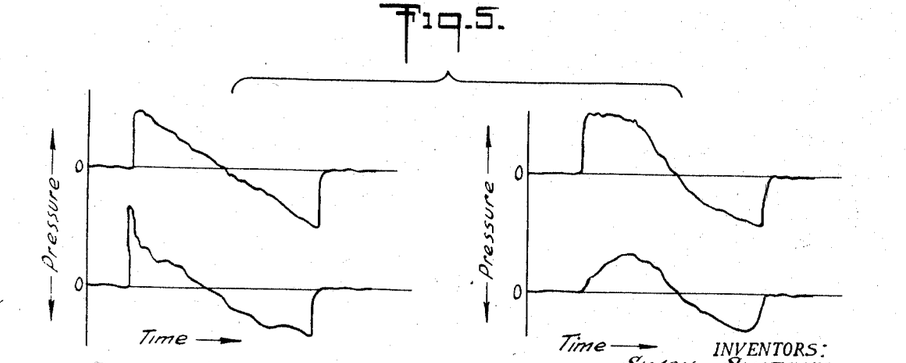
FIGURE 5 comprises several graphs depicting the pressure variations in typical sonic boom pressure waves actually created by the flight of supersonic aircraft.

FIGURE 5 shows typical pressure wave-forms or "signatures" of sonic boom pressure waves. Such waves usually have pressure peaks or valleys of from one to four pounds per square foot and a time duration of from 0.1 to 0.2 second. Each aircraft produces its own individual "signature" so that it is desirable to provide test apparatus in which the signature shape can be varied.

Figures 1, 2:
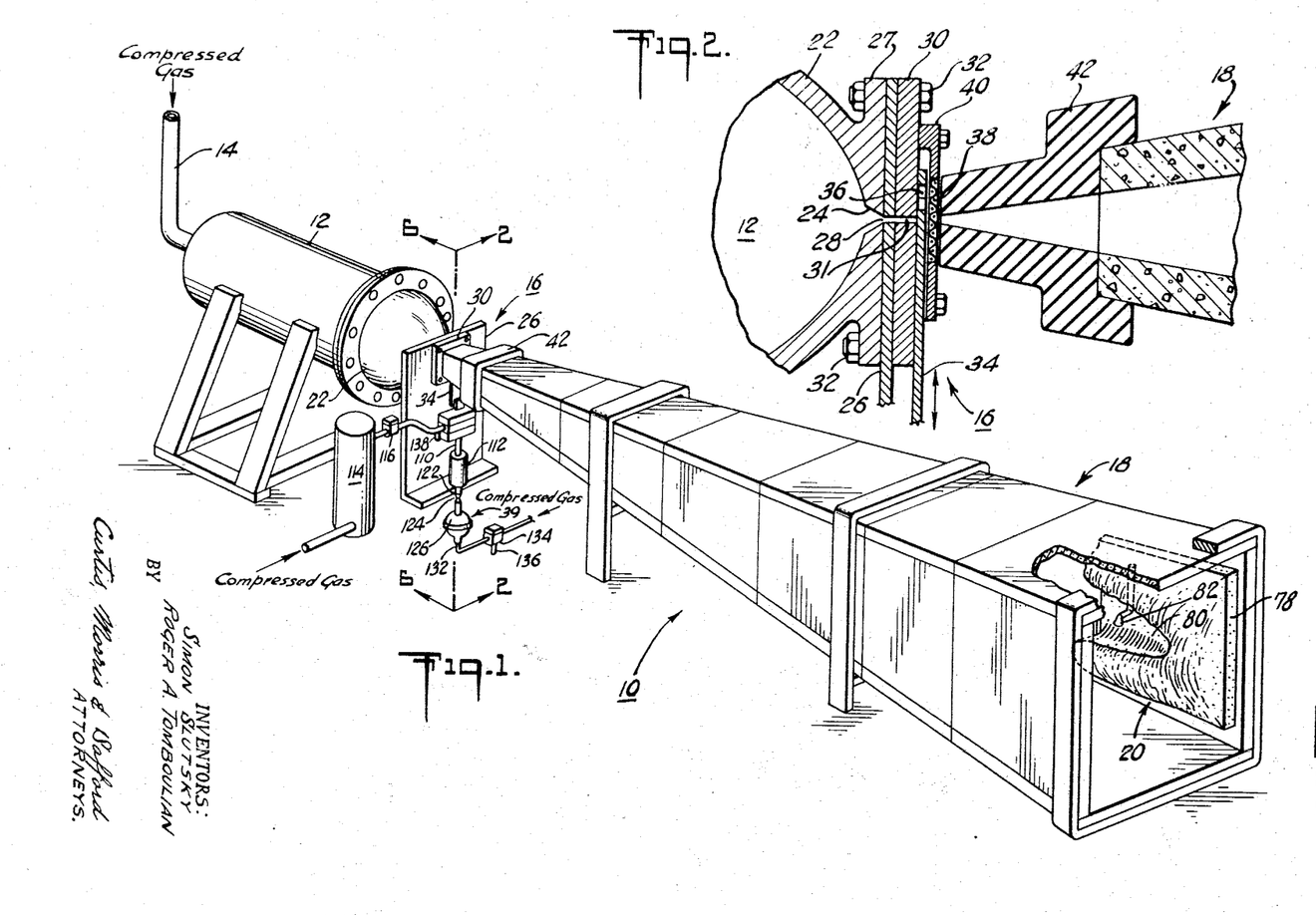
FIGURE 1 is a perspective view of pressure wave generating apparatus constructed in accordance with the present invention.
FIGURE 2 is a cross-sectional view taken along line 2—2 of FIGURE 1.

In FIGURES 1 and 2 there is shown a pressure wave generator 10 used as a sonic boom simulator in accordance with the present invention. The simulator 10 includes a compressed gas tank 12 which is supplied through an inlet pipe 14, a valve device indicated generally at 16, and a horn 18 which delivers pressure waves to a test station 20 within the horn.

Figures 6, 7, 8, 9, 10:
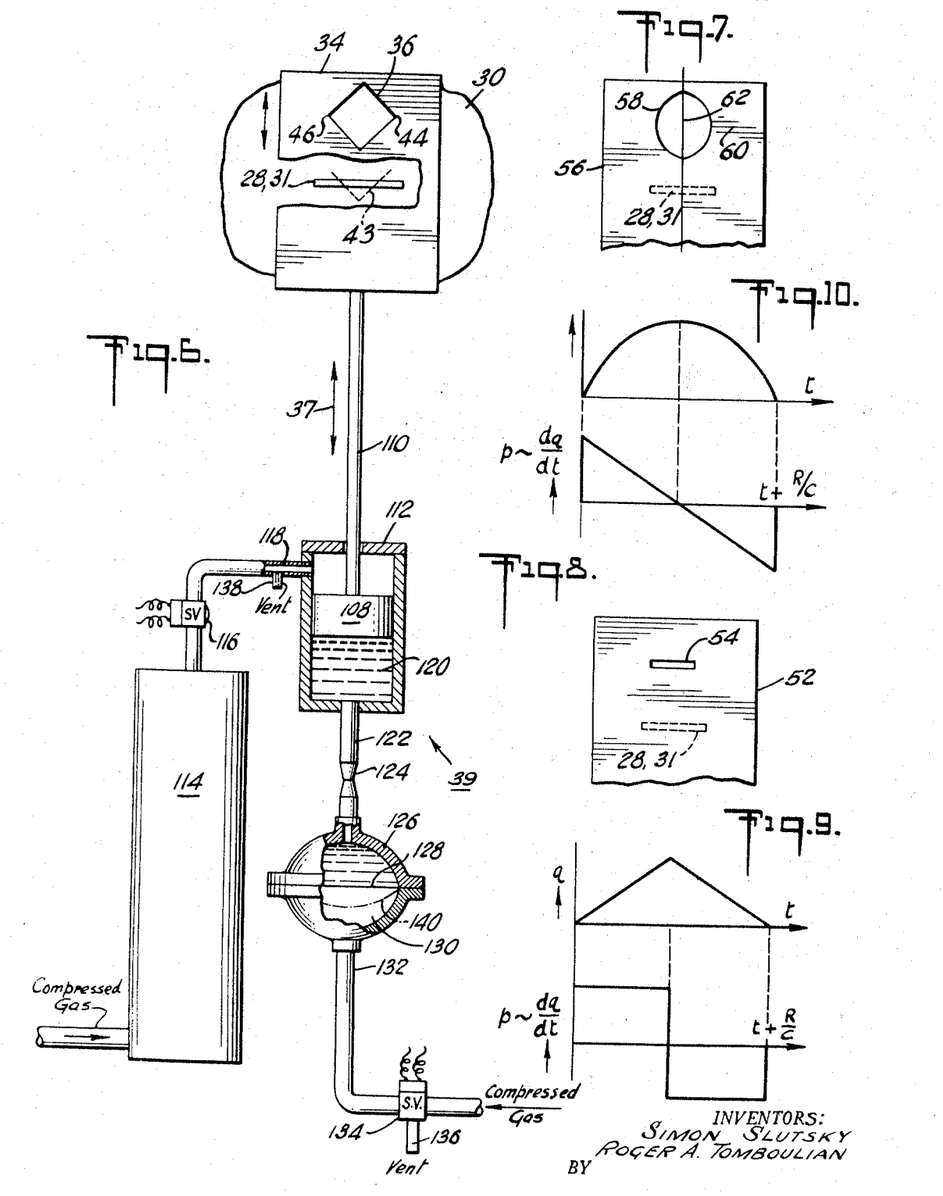
FIGURE 6 is an enlarged and partly schematic view of a portion of the device shown in FIGURES 1 and 2.
FIGURES 7 and 8 show modified components of the structure shown in FIGURE 6.
FIGURES 9 and 10 are set of graphs depicting the principles of operation of the devices shown in FIGURES 6, 7 and 8.

Referring particularly to FIGURE 2, the right portion 22 of the tank 12 converges gradually and then relatively sharply at 24 to form a converging exit nozzle for the tank. The valve device 16 includes a mounting plate 26 secured to a flanged portion 27 at the right end of tank 22, with an elongated, rectangular horizontal slot 28 (also see FIGURE 6) which forms an exit opening for the nozzle 24. Another plate 30 with a rectangular slot 31 of the same shape as the slot 28 in plate 26 is mounted on the plate 26. The slots 28 and 31 register with one another so as to form a continuous, narrow rectangular gas flow passageway. A valve plate 34 (also see FIGURES 1 and 6) is slidably mounted over the gas passageway formed by the slots 28 and 31. As is best seen in FIGURE 6, the valve plate 34 has an orifice 36 in it. Valve plate 34 is moved upwardly and downwardly in the direction indicated by the arrow 37 in FIGURE 6 so as to move the orifice 36 in and out of registration with the slots 28 and 31, and thus open and close the nozzle exit opening. The manner in which the plate 34 is moved, and other details of the valve operation will be described below.

Referring again to FIGURE 2, a screen 38 is mounted in front of slots 28 and 31 and the hole 36 by means of a bracket 40. Screen 38 can be made of wire or cloth, and its purpose is to smooth the flow in the nozzzle, making the flow uniform across the duct and suppressing eddy flows which might generate undesired high-frequency pressure wave components. The screen 38 also serves to damp any high frequency resonant oscillations which might occur at this point in the system. A coupling 42 is secured to the small end of the horn 18 and is positioned closely adjacent to the screen 38 so as to transmit pressure waves emanating from the valve arrangement 16. The coupling 42 preferably is made of rubber or other soft, flexible material in order to isolate mechanical vibrations of the valve from the horn 18.

The above-described apparatus is used as follows in order to produce pressure waves having a predetermined waveshape: a compressed gas, preferably air, is supplied to the tank 12 at a pressure above "critical" pressure; that is, at a level high enough to ensure that the gas flow through the exit nozzle 24 from the tank 12 has sonic velocity. Applicants have discovered that releasing a pressurized gas while controlling its mass flow rate in accordance with a mathematical function derived from the general flow equations describing the gas flow, and then allowing the pressure wave so formed to expand substantially spherically, will produce, at some point a certain distance from the point of control, a pressure wave having the desired waveshape.

Figure 3:
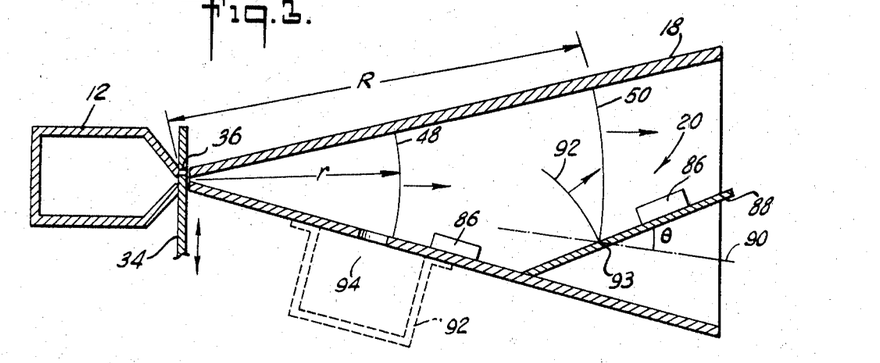
FIGURES 3 and 4 are schematic diagrams of sonic boom testing arrangements constructed in accordance with the present invention.

The pressure wave emerging from the valve 16 travels through the horn 18 in a substantially spherical wavefront, as is shown at 48 and 50 in FIGURE 3. Following are the equations describing the flow through the nozzle 24 and the subsequent spherical expansion of the pressure wave in the horn 18, assuming that viscous wall interactions can be neglected (a valid assumption for most of the flow);

(1) $$q = \rho u A$$

(2) $$\frac{\partial p}{\partial t} + u\frac{\partial p}{\partial r} + u\frac{dA}{dr} = 0$$

(3) $$\frac{\partial u}{\partial t} + u\frac{\partial u}{\partial r} + \frac{1}{\rho}\frac{\partial p}{\partial r} = 0$$

(4) $$\frac{\partial s}{\partial t} + u\frac{\partial s}{\partial r} = 0$$

Where, at any given duct radius $r$ (see FIGURE 3):

$q$ is the mass flow rate through the nozzle;
$\rho$ is the gas density;
$u$ is the gas velocity;
$p$ is the gas pressure;
$s$ is the entropy of the gas;
$A$ is the cross-sectional area of the duct;
$t$ is the time which has elapsed since initiation of the pressure wave.

Figure 18:
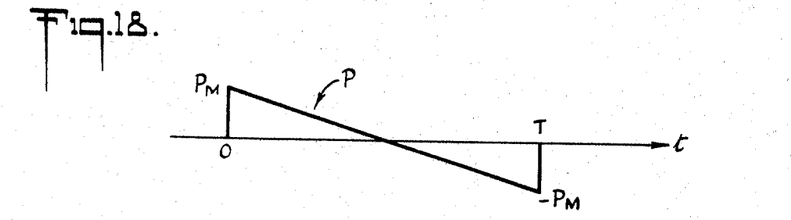
FIGURES 18, 19 and 20 are graphs depicting the principles of operation of the device shown in FIGURE 17.

In the preferred embodiment of the invention, the desired pressure wave is produced in the horn 18 by varying the mass flow rate $q$ through the nozzle 24 so as to produce the desired pressure variation at the particular radius selected. The variation of $q$ is produced quite simply and predictably by varying the area of the exit opening of the nozzle 24. Since the flow through the nozzle is at sonic velocity, the mass flow rate is directly proportional to the nozzle exit area.

The following are two other equations which describe the relationships between the parameters of the pressure wave generation system:

(5) $$p \sim 1/r$$
(6) $$p \sim P_o$$

Where $P_o$ is the gas pressure in the reservoir 12, and $p$ and $r$ are defined above.

From Equations 1 through 6, it can be determined what supply pressure $P_o$ must be provided at a selected test station radius $r$, and in what manner the mass flow through the nozzle is to be varied during the test to produce the desired pressure wave. In the preferred embodiment, the supply pressure $P_o$ should be maintained relatively constant during generation of a pressure wave so that the wave pressure $p$ will vary only with $q$, the mass flow rate. Therefore, the capacity of the reservoir 12 should be large enough to minimize such supply pressure variations.

It is desirable to maintain the front of the wave in spherical form in the horn 18 in order to maintain the above-described relationships, and to prevent unwanted reflections. Therefore, the sides of the horn 18 are straight in the direction of wave transmission. Actually, spherical wavefronts could be obtained by allowing the waves to expand in free space. However, the use of the horn 18 improves upon such an arrangement by eliminating interference from outside pressure waves, by eliminating reflections from surrounding objects, and by preventing the great loss of energy which would accompany a free-space expansion of the pressure wave. The shape of the horn 18 is frusto-pyramidal; that is, the horn is shaped like the frustum of a pyramid. However, the horn 18 may be frusto-conical, or may have many other different cross-sectional shapes, as long as the internal walls of the horn are straight in the direction of wave transmission. It usually is convenient to make the cross-sectional shape of the horn symmetrical with respect to its longitudinal axis. The walls of the horn 18 preferably are made of a relatively massive and thick material which does not readily vibrate under the influence of the pressure waves being transmitted within the horn. The reason for this is to prevent parasitic oscillations from appearing in the pressure wave form. Advantageously, the walls of the horn are made of preformed concrete slabs which are cemented or otherwise fastened together in the shape shown in FIGURE 1. Alternatively, steel plates can be used.

In the embodiments of the invention in which the horn is open-ended or reflections are not present, the mathematical function describing the mass flow rate is the time-integral of the pressure wave desired. Thus, in order to produce the desired waveshape in the latter embodiments, the curve describing the variation of the mass flow rate with respect to time should be shaped so that the curve describing its time-derivative is the desired waveshape. That is:

(7) $$p \sim dq/dt$$

Where $p$ is the instantaneous pressure of the desired wave, and $q$ and $t$ are defined above. It is believed that this relationship first exists at a distance $r$ from the valve which is great enough to make the mean gas velocity relatively small; the radius at which the above equations can be linearized. It is believed that the minimum distance $r$ at which this relationship holds true is the distance at which the ratio of the area $A$ of the horn 18 to the area of the outlet of the nozzle 24 is approximately 40/1.

Variation in the exit area of the nozzle 24 is provided quite simply and uniquely in the present invention in the manner illustrated schematically in FIGURE 6. The valve plate 34 is moved downwardly across the nozzle exit opening 31 at a constant velocity. As the plate moves downwardly, the opening in the plate moves into registry with the nozzle opening 31, as is indicated by the dashed line 43. In this manner, an increasing portion of the nozzle exit opening is uncovered, and the nozzle exit area is effectively changed in accordance with the shape of the opening in the valve plate.

In the specific case of the open-ended or non-reflective horn, the opening in the valve plate is shaped so as to vary the nozzle exit area in accordance with the time-integral of the pressure wave being simulated. As one example, the orifice 36 is diamond-shaped. As the plate 34 moves downwardly at a constant speed, the nozzle exit area first increases until the lateral points 44 and 46 of the diamond-shaped orifice 36 are aligned with the slot 31. Then, as the plate 34 continues to move downwardly past the slot 31, still at a constant velocity, the nozzle exit area decreases until the top point of the diamond has moved past the slot and the flow once again stops entirely. The resulting variation in the mass flow rate $q$ with respect to time is shown in the upper portion of FIGURE 9. Because of the shape of the orifice 36 and the movement of the orifice past the nozzle opening 31 at a constant velocity, the mass flow rate starts at zero, increases linearly to a peak, and then decreases linerally back to zero.

The lower half of FIGURE 9 is a graph depicting the variation with time of the time-derivative of the mass flow rate, and, hence, the pressure variation with time, at a test location R (see FIGURE 3). The pressure wave is seen to be a square wave. The wave is shown as if it started at the same time as the curve describing $q$, but it is to be understood that the actual starting time for the pressure wave is later than the starting time for the $q$ curve by an amount $R/C$, where C is the speed of sound in the gas in the horn 18.

The mass flow rate changes producing the pressure wave shown in FIGURE 9 can be obtained also by use of a plate 52 (FIGURE 8) with a rectangular slot 54 instead of the plate 34 with its diamond-shaped orifice 36. The slot 54 is not as long as the slot 31. Movement of plate 52 past the slot 31 at a constant speed varies the mass flow from the nozzle in accordance with a curve shaped like the one shown at the top of FIGURE 9, and the resulting pressure variation has a waveshape like that shown at the bottom of FIGURE 9. However, the rate of area variation is relatively much greater than that of the plate 34 for the same amount of plate movement. Thus, relatively narrow wave peaks can be produced with relatively slow movement of the valve plate.

FIGURES 7 and 10 illustrate how to form a N-shaped pressure wave such as that illustrated in the lower part of FIGURE 10. It is to be noted that this waveshape is particularly desirable for use in sonic boom simulation because of its similarity to the actual pressure signatures such as those shown in FIGURE 5. A different valve plate 56 is provided in the FIGURE 7 arrangement in place of the plate 34 shown in FIGURE 6. Plate 56 has an orifice 58 which is formed of two parabolae having a common horizontal axis 60, the parabolae being joined along a vertical axis 62. As this orifice 58 is moved past the slot 31 at a constant velocity, the mass flow rate varies with respect to time as is shown in the upper part of FIGURE 10. The resulting pressure waveshape is shown in the lower part of FIGURE 10.

From the foregoing, it can be seen that virtually any pressure waveshape can be produced merely by varying the mass flow rate through the valve 24 in accordance with the principles described above. This can be done in many ways, although the method described above is preferred. Instead of providing differently shaped valve plates, a valve plate with a single orifice can be used and the speed of movement past the valve opening can be varied to provide the mass flow rate changes desired. The rise time and durations of various portions of the waveshape can be controlled by controlling the speed of the valve plate past the valve orifice. At very high plate speeds, viscous effects become important and compensation for these effects should be made.

A constant speed motor with a rack and pinion drive arrangement can be used to move the valve plate at a constant velocity. However, a preferred constant speed drive system 39 is shown schematically in FIGURE 6. The driver of the drive system 39 includes a piston 108 connected by a rod 110 to the valve plate 34. The piston slides in an enclosed cylinder 112. Compressed air is supplied at a relatively high pressure (e.g., several hundred pounds) from a reservoir 114 through a solenoid valve 116 and a conduit 118 to the portion of the housing 112 which is above the piston 108. Water or another suitable incompressible fluid fills the portion 120 of the housing which is below the piston 108. A conduit 122 is connected to the bottom of the housing 112 and provides a passageway for the flow of water through a line restrictor 124 into an accumulator 126.

The accumulator 126 has a flexible membrane 128 which divides the top half of the accumulator housing from the bottom half 130. A pipe 132 leads from the bottom compartment 130 through a solenoid valve 134 to a source of compressed gas (not shown). A vent 136 is provided in the line 132 and is opened and closed by the solenoid valve 134. A small vent 138, which is continuously open, is provided in the line 118 leading to the top of the piston 108.

The constant speed drive system 39 operates as follows: With the plate in its uppermost location as shown in solid lines in FIGURE 6, the solenoid valve 116 is opened to allow high-pressure air to flow from tank 114 through line 118 to the top of piston 108. This creates a high pressure on the upper surface of the piston and causes it to force water downwardly out of the housing 112 and through the restrictor 124. The presence of the restrictor maintains a substantially constant flow of water from the cylinder 112, and thus regulates the movement of the valve plate 34. Because of the relatively large capacity of the tank 114, its pressure does not vary significant during the movement of the valve plate, so that the speed of movement of the plate 34 is substantially constant.

The water which flows through the restrictor 124 accumulates in the upper portion of the accumulator 126 and causes the flexible membrane 128 to flex downwardly to the position 140 shown in dashed outlines. The air which is displaced from the portion 130 of the accumulator by the flexing of the membrane 128 is allowed to escape from the vent 136 in the line 132, which is kept open by the solenoid valve 134. However, the valve 134 closes the connection of line 132 to the compressed gas source during downward movement of the piston 108. A small quantity of air also escapes from the vent 138 in line 118, but this is insignificant in comparison with the capacity of the tank and does not affect the operation of the system.

When it is desired to return the plate 134 upwardly to its initial starting position, the solenoid valve 116 is turned off, the solenoid valve 134 is opened, and the vent 136 is closed. Compressed gas fed into line 132 through valve 34 forces the membrane 128 upwardly from its position 140. This forces the water back into chamber 112, and thus forces the piston 108 and the plate to move upwardly, and air displaced from the upper portion of the chamber 112 escapes through the vent 138.

The actual valve structure used to perform the wave generation process of the present invention can take many different forms. If it is desired to repeat a desired wave rapidly, or to provide several waves of different form in rapid succession, a series of appropriately-shaped orifices can be spaced along a plate or band of metal or other suitable material, and the band can be moved past the valve opening to provide the succession of pressure waves. The band can be stored on reels, or it can be a continuous loop, as desired. Alternatively, the orifices could be positioned around the periphery of a flat disk, and the disk could be rotated so that the orifices move past the valve outlet in rapid succession.

Figure 16:
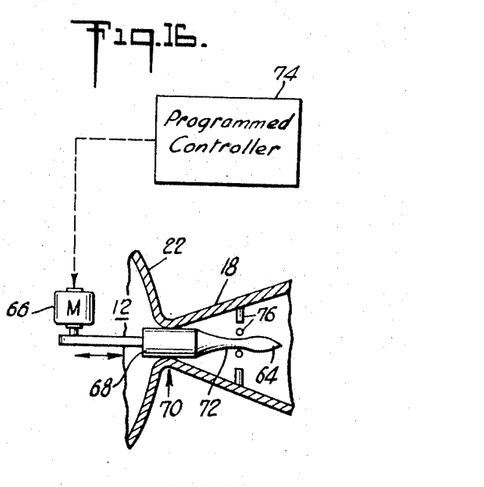
FIGURES 16 and 17 are schematic views of two further embodiments of the present invention.

Another alternative valve arrangement is shown schematically in FIGURES 16. In the FIGURE 16 structure, a contoured pintle 64 fits into the nozzle orifice at 70, and is moved to the left or to the right by a motor 66. The pintle 64 has a substantially cylindrical portion 68 which, when positioned as shown in FIGURE 16 in the orifice 70 of the nozzle arrangement, substantially blocks the flow of gas from the chamber 12. The front portion 72 of the pintle 64 is contoured so that when the pintle is moved to a position in which the portion 72 is adjacent the orifice 70 of the valve, gas flows through the nozzle in an amount dependent upon the opening between the pintle and the nozzle walls at position 70. A programmed controller 74 can be provided to control the speed of the motor 66 so that the mass flow rate through the nozzle is controlled in accordance with the time integral of the pressure wave desired. Alternatively, the pintle 64 can be driven at a constant velocity and the desired pressure variation can be obtained by selecting the contour of the contoured portion 72 of the pintle. A plurality of rods 76 or a screen (not shown) may be provided downstream from the nozzle outlet 70 in order to smooth the flow and damp unwanted pressure waves.

Actual tests have been performed with apparatus constructed as shown in FIGURES 1 through 3 and 6 through 10. Compressed air was used as the driving gas, and the air pressure in tank 12 was around 100 p.s.i.g.

Figure 11:
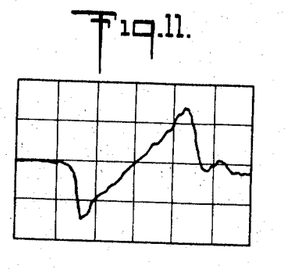
FIGURES 11 and 12 are reproductions of pressure waveforms obtained in actual tests of apparatus such as that shown in FIGURES 1 through 4 and 6 through 10.

The horn 18 had a square cross-section, and had a length of 30 feet. The principal construction material for the horn was relatively thick plywood. A valve plate 56 such as that shown in FIGURE 7 was used, and was moved past the valve outlet 31 at a constant speed by means of the drive system 39 described above. The pressure variation was measured at a radius r of 20 feet, and an oscillograph of the pressure variation with respect to time was made. A reproduction of the oscillograph which was obtained is shown in FIGURE 11. It is seen from FIGURE 11 that the waveshape produced is quite close to that which was predicted theoretically and shown in FIGURE 10. The wave had a duration of 2.4 milliseconds, and had a peak pressure intensity of one pound per square foot, an intensity which is of the same order of magnitude as many sonic boom pressure waves. The rise time of the wave was of the order of 0.1 millisecond. It can be seen that the wave thus produced quite closely simulates the wave shown in the upper left-hand corner of FIGURE 5.

Figure 12:
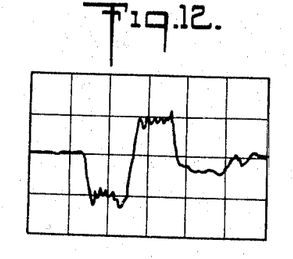

FIGURE 12 is another reproduction of an oscillograph taken at a test station in the horn 18 of the test apparatus, and is the same as the graph of FIGURE 11 except that the plate 34 with its diamond-shaped orifice 36 shown in FIGURE 6 was used instead of the plate 56 shown in FIGURE 7. It is seen that the pressure wave is a square wave, and is in close correspondence with the waveshape predicted theoretically and shown in the lower part of FIGURE 9. The total time duration of the wave was about 4 milliseconds.

The above-described wave generating method and apparatus can be used in many ways. For example, as is shown in FIGURE 1, a plaster model 78 of typical ground terrain can be positioned inside the horn 18. The particular model shown in FIGURE 1 simulates a paraboloid-shaped valley 80. A microphone 82 is positioned in or near the valley to record the variations of sound intensity. It was found, for example, that the sonic boom pressure at or near the approximate focus of the paraboloid valley was approximately eight times incident pressure.

It is to be noted from FIGURE 1 that since the sonic boom wave fronts are spherical, the model advantageously can be placed at either side of the horn 18, or in any desired position which is convenient for test purposes. It is a highly advantageous feature of the present invention that since the pressure waves travel through the horn in much the same manner as the waves travel over the ground when generated by an aircraft flying at supersonic speed, the simulation of the effects of the sonic boom waves is quite realistic and virtually complete.

FIGURE 3 illustrates one mode of testing the reaction of a physical object 86 to simulated sonic boom pressure waves. The model 86 can constitute a scale model of a building or other structure which might be damaged by sonic boom pressure waves. If desired, the model 86 to be tested can be placed on the bottom or side of the horn 18 in the manner illustrated in the central portion of FIGURE 3. Alternatively, the object 86 can be placed on a ramp 88 which is inclined towards the central axis of the horn. This arrangement provides a reflected wave 92 which is quite similar in shape to the reflected waves following sonic boom waves actually produced by flying aircraft, and both the incident wave 50 and the reflected wave 92 sweep over the object 86 on the ramp 88 in the same way that actual waves sweep over objects on the ground.

The ramp 88 preferably has one edge which rests against one side wall of the horn 18. The ramp 88 forms an angle $\theta$ with the direction 90 along which waves are propagated. The line 90 is a straight line drawn through the point 93 at which the incident wave front 50 strikes the ramp and the apex of the pyramid formed by extending the walls of horn 18 to a terminal point.

In accordance with another aspect of the present invention, the pressure waves can be made to simulate those produced by aircraft flying at a specific Mach number M. This can be done simply by varying the angle $\theta$ in accordance with the following equation:

(8)
$$M = \frac{1}{\cos \theta}$$

where:

M is the given Mach number to be simulated; and
$\theta$ is the ramp inclination angle as defined above.

Thus, when it is desired to test the effect of sonic boom waves produced by an aircraft flying at Mach number M on the object 86, the angle $\theta$ can be varied either by moving the object to the appropriate position on the ramp 88, or by tilting the ramp 88 to an appropriate new inclination, or by a combination of both procedures. The object 86 should be positioned on the ramp at a point several wavelengths away from the intersection of the horn wall and the ramp so as to ensure proper formation of the trailing wave 92.

Figure 4:
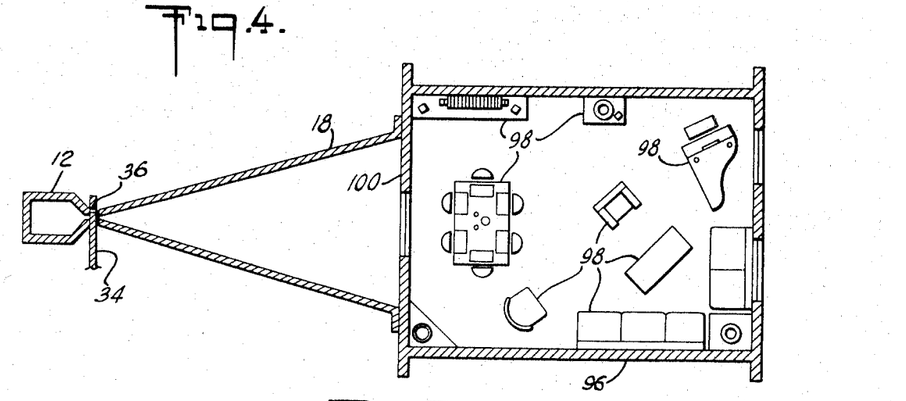

An alternative test arrangement is shown in FIGURE 4 in which a room 96 full of furniture 98 is positioned at the exit opening of horn 18. In this manner, the sonic boom waves can be beamed directly into the room to test their effect on the furniture, the windows and even people in the room.

The possible effects of reflected pressure waves has not yet been considered in this description. In some test situations reflections will be insignificant and need not be compensated for. Such an arrangement might be one in which the test object is small and is placed in a large horn with a relatively large open end. However, if the test object is large, or if a ramp 88 is used, or if the large end of the horn is partially or fully closed, then the incident pressure waves likely will be reflected off of the surfaces in or at the end of the horn. Longitudinally reflected waves likely will travel to the apex of the horn, be reflected back towards the large end of the horn, and sweep over the test subject. Other reflections are reflected off of the lateral walls of the horn. If the duration of the test is short relative to the time of travel of reflected waves up and down the horn, then the effect of the longitudinal reflections can be ignored. For example, if the effects of only a single wave of 10 milliseconds second duration is desired to be tested, and the total travel time for longitudinal reflected waves to return to the test station is 20 milliseconds, then the reflected wave will return too late to adversely affect the test and can be ignored. However, if the duration of the test wave is greater than 20 milliseconds, or if the sound level after the sonic boom is an important part of the test, then the reflections should be dealt with by one of the methods described below.

One way of minimizing the effects of reflections is by placing a test room 92 (FIGURE 3) outside and at the side of the horn 18, with a hole 94 in the side of the horn to allow waves to enter the test room. Also, a series of acoustic "wedges"; i.e., wedge-shaped bodies of sound-absorbing materials, can be located in the horn downstream from the hole 94 to absorb reflections.

Figure 13:
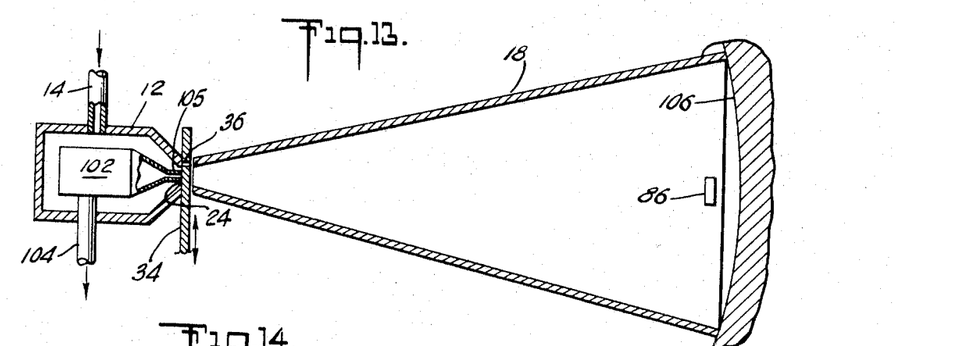
FIGURE 13 is a schematic diagram of another embodiment of the invention.
Figure 14:
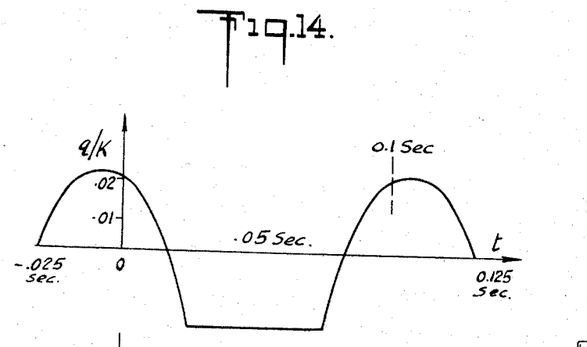
FIGURES 14 and 15 are graphs depicting operational features of the embodiment shown in FIGURE 13.
Figure 15:
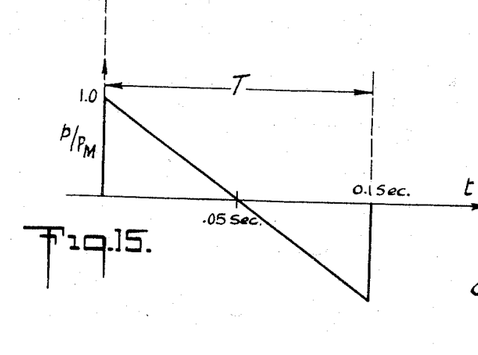

An alternative method of minimizing reflected waves is to vary the mass flow rate of the gas in a manner such as to interact with and counteract the effects of the reflections when they reach the apex of the horn. As an example, FIGURE 14 illustrates the manner in which the mass flow rate should be varied to provide the N-shaped pressure wave shown in FIGURE 15 when the horn 18 is terminated with a spherical surface 106 as is shown in FIGURE 13. Use of Equations 1 through 4 set forth above gives curve such as that shown in FIGURE 14 for the quantity $q/K$, where K is a constant defined by the following equation:

(9)
$$K = \frac{2P_M A T}{R}$$

where:

$P_M$ is the maximum signature pressure in pounds per square foot;
A is the maximum cross-sectional area of the horn, in square feet;
T is the period of the wave desired to be produced, in seconds; and
R is the radius of the horn at which the test is being made, in feet.

Assuming that the test station is at the large end of the horn 18 and the horn is twenty-five feet in length, R is 25 feet. Assuming also that the horn diameter at its large end is 12 feet, A is approximately 113 square feet. Further assuming that the desired duration (T) of the wave is 0.1 second and the maximum pressure ($P_M$) desired in the wave is four pounds per square foot, $K=3.6$ slugs per second. By comprising FIGURES 14 and 15, it can be seen that the flow of compressed gas starts about 0.025 seconds prior to the start of the pressure wave at the test section.

FIGURE 13 shows an arrangement for producing the mass flow curve of FIGURE 14. The arrangement shown in FIGURE 13 is substantially the same as that shown in FIGURES 1 through 3 and 6 through 10 except that a vacuum tank 102 is positioned inside of the compressed gas tank 12 and is evacuated through a pipe 104 by means of a vacuum pump (not shown). The end opening 105 of the vacuum tank 102 as well as the exit nozzle 24 of the tank 12 is closed and opened by the valve plate 34. Also, as noted above, a hemispherical surface 106 is positioned at the large end of the horn 18, simply as another example of a termination surface which might be used in a typical test system.

As the valve plate 34 is moved downwardly from a position in which hole 36 is above the exits of both tanks 12 and 102, hole 36 registers successively with the exit of tank 12 (as shown in FIGURE 13), then with the exit of tank 102, again with tank 12, and then with neither tank. In this manner, there is produced first a positive mass flow, then a negative mass flow, and then another positive mass flow. These mass flows together interact with the wave reflected off of the spherical surface 106 and produce the desired signature shown in FIGURE 15.

One of the teachings of the present invention is that pressure waves may be produced by controlled release of a pressurized gas into a properly shaped horn. It is preferred to control the mass flow rate of the gas after its initial release by controlling the exit area of the nozzle. However, under certain conditions it may be desirable to vary the mass flow rate by varying Po, the source pressure, instead of by varying the nozzle exit area. Variation of Po can be obtained by many known means. The variation can be obtained, for example, by replacing the tank 12 with a shock tube at the inlet of the nozzle 24, and piercing a diaphragm of the shock tube to release high-pressure gas into the nozzle and horn and control the subsequent source pressure variations in a manner well known in the shock tube art.

Figure 17:
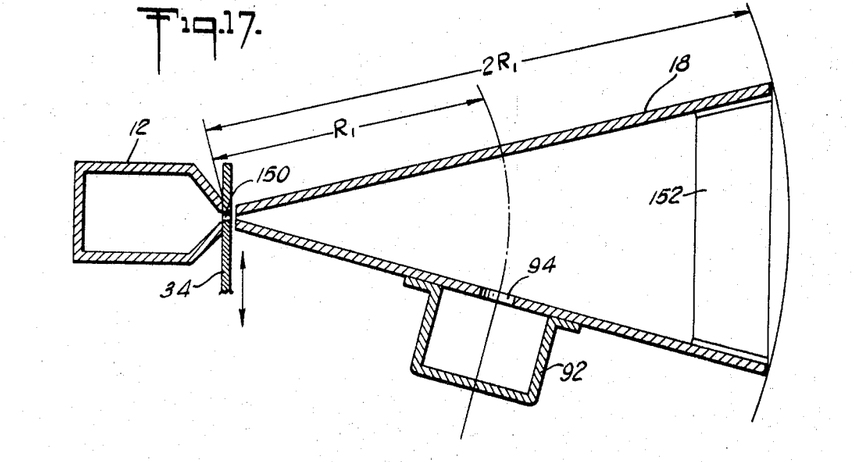

Another method of minimizing the undesirable effects of longitudinal reflections is illustrated in FIGURES 17 through 20. The apparatus shown in FIGURE 17 is identical to that shown in FIGURE 3, except that the ramp 88 is not used, a valve hole 150 of a shape different from that of the hole 36 is provided, and the acoustic absorbtive material 152 described but not shown in FIGURE 3 is shown in FIGURE 17. Furthermore, the side room 92 is located midway along the horn and is centered at a radius $R_1$.

The end of the horn preferably is left open as shown in FIGURE 17. With such a configuration, the wave reflected by the open end will be negative in polarity. In accordance with the method of the present invention, the mass flow rate q from the chamber 12 is varied in a manner such that a positive pressure wave of the same shape and magnitude as the negative reflected wave meets the reflected wave at the radius $R_1$ and cancels it, thus preventing the reflected wave from entering the test room 92.

Figure 19:
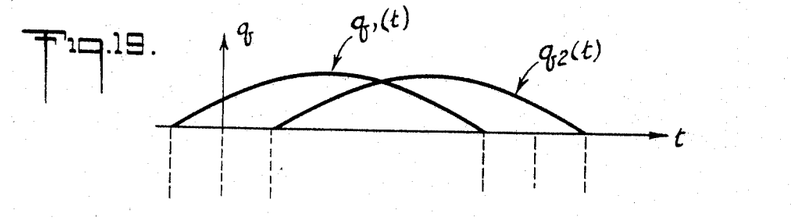
Figure 20:
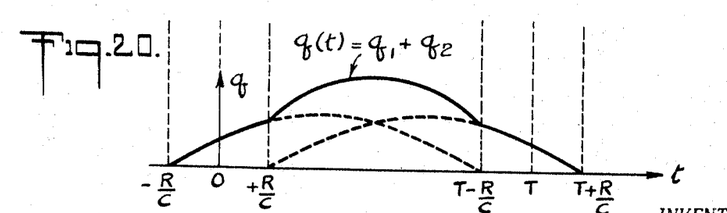

FIGURES 19 and 20 illustrate the mass flow rates necessary to produce the N-shaped pressure wave shown in FIGURE 18 at the horn exit, and to produce a wave suitable for cancelling the reflected wave. It is assumed that the reflected wave has the same magnitude and shape as the incident wave, except that the reflected wave is negative instead of positive. The curve $q_1(t)$ describes the mass flow necessary to produce the pressure wave shown in FIGURE 18. Assuming the latter pressure wave has a period T and a maximum value $P_M$, the pressure p is described by the following equation:

(10)
$$p = P_M \left(1 - 2\frac{t}{T}\right)$$

Thus, in accordance with the principles set forth hereinabove, (11)
$$q_1(t) = \frac{A_1 P_M}{CT}\left[t - \frac{R}{C}\right]\left[T - \left(t - \frac{R}{C}\right)\right]$$

In which $A_1$ is the cross-sectional area of the horn 18 at the radius $R_1$, and the other terms have the definitions given above.

The curve $q_2(t)$ illustrates the mass flow rate necessary to produce the positive reflection-cancelling wave. Thus:

(12)
$$q_2(t) = \frac{A_1 P_M}{CT}\left[t + \frac{R}{C}\right]\left[T - \left(t + \frac{R}{C}\right)\right]$$

The overall mass flow curve $q(t)$ is shown in FIGURE 20. Of course;

(13)
$$q(t) = q_1(t) + q_2(t)$$

The orifice 150 can be shaped so as to give the mass flow rate curve $q(t)$ in accordance with the principles described above.

In actual practice, the reflected wave will not have the same magnitude or shape as the incident wave. The absorbtive material 152 can be used to attenuate the reflected wave. The wave used for reflection cancellation can be modified by variation of the mass flow rate so as to cancel such a reflected wave.

The proper mass flow control can be obtained by electrically sensing the reflected wave and then varying the throat orifice at the outlet from the tank in accordance with the sensed wave. If it is preferred to use the system described above in which the plate 34 has an orifice 150 with the proper shape for generating both the incident and the reflected waves, the proper shape for the orifice 150 can be determined by first shaping it to generate the proper incident wave then sensing the reflected wave, and re-shaping the orifice 150 to generate the proper cancelling wave.

The foregoing pressure wave generation method and apparatus are highly advantageous. The method is simple to perform, and achieves accurate results. The apparatus is relatively inexpensive to build. Quite importantly, the waves can be made to sweep across test objects in much the same manner as do actual sonic boom pressure waves created by aircraft, with the result that very realistic and accurate tests can be performed.

The above description of the invention is intended to be illustrative and not limiting. Various changes or modifications in the embodiments described may occur to those skilled in the art and these can be made without departing from the spirit or scope of the invention as set forth in the claims.

We claim:

1. Apparatus for generating pressure waves at a test station, said pressure waves having a predetermined waveshape describing the variations of wave pressure with respect to time, said apparatus comprising, in combination, a source of compressed gas, a nozzle connected to said source, valve means for regulating the mass flow rate of gas from said source through said nozzle, said valve means comprising a valve member normally blocking the outlet of said nozzle, said member being movable across said outlet and having an orifice contoured so as to provide outlet area variation when moved past said outlet at a constant velocity, drive means for moving said member past said outlet at a constant velocity, and means for transmitting to said test station the pressure waves resulting from the regulated flow of gas from said source.

2. Apparatus as in claim 1 in which said drive means comprises a piston coupled to said plate, a housing in which said piston is slidably mounted, a restricted outlet from said housing, an incompressible fluid in said housing between said piston and said outlet, and means for selectively supplying a compressed gas to said housing at a position opposite to said incompressible fluid.

3. Sonic boom pressure wave simulation apparatus, said apparatus comprising, in combination, a reservoir of compressed gas, a converging nozzle exiting from said reservoir, said nozzle having an elongated slit as an exit opening, a valve plate covering said exit orifice, said plate being movable across said opening and having an orifice positioned to register with said nozzle opening when said plate is moved across said opening, said orifice being shaped so as to vary the effective exit area of said nozzle in proportion to the time integral of the sonic boom pressure signature to be simulated when said plate is moved across said opening at a constant velocity, means for moving said plate across said opening at a constant velocity, said means comprising a piston coupled to said plate, a housing in which said piston is slidably mounted, a restricted outlet from said housing, an incompressible fluid in said housing between said piston and said restricted outlet, a reservoir having a flexible diaphragm for receiving said fluid from and returning said fluid to said restricted outlet, means for selectively supplying a compressed gas to said housing at a position on the side of said piston opposite to said incompressible fluid, and means for selectively supplying a compressed gas to said diaphragm, a screen covering the gas flow passageway formed by said orifice in said plate and said nozzle exit opening for filtering unwanted high-frequency components out of the pressure waves being transmitted, a fusto-pyramidal horn positioned for receiving pressure waves through said screen, and a flexible coupling member coupling the small end of said horn to said screen, the walls of said horn being made of a relatively massive and non-vibratory material.

References Cited

UNITED STATES PATENTS 3,102,553   9/1963   Ottstead ___________ 137—509

RICHARD C. QUEISSER, *Primary Examiner.*

J. W. WHALEN, *Examiner.*

U.S. Cl. X.R.

73—147